(12) United States Patent
Wan et al.

(10) Patent No.: US 9,148,319 B2
(45) Date of Patent: Sep. 29, 2015

(54) DYNAMIC TASK SCHEDULING FOR MULTI-RECEIVE-PATH EQUALIZER

(71) Applicant: SHANGHAI MOBILEPEAK SEMICONDUCTOR CO., LTD., Shanghai (CN)

(72) Inventors: Feng Wan, Shanghai (CN); Weiping Xu, Shanghai (CN); Yuan Li, Shanghai (CN); Qiuzhen Zou, Shanghai (CN)

(73) Assignee: SHANGHAI MOBILEPEAK SEMICONDUCTOR CO., LTD. (CN)

( * ) Notice: Subject to any disclaimer, the term of this patent is extended or adjusted under 35 U.S.C. 154(b) by 14 days.

(21) Appl. No.: 14/344,474

(22) PCT Filed: Feb. 20, 2013

(86) PCT No.: PCT/CN2013/071689
§ 371 (c)(1),
(2) Date: Mar. 12, 2014

(87) PCT Pub. No.: WO2014/127508
PCT Pub. Date: Aug. 28, 2014

(65) Prior Publication Data
US 2015/0215139 A1   Jul. 30, 2015

(51) Int. Cl.
H04K 1/10   (2006.01)
H04L 25/03  (2006.01)

(52) U.S. Cl.
CPC ................. H04L 25/03891 (2013.01)

(58) Field of Classification Search
CPC .......... H04L 25/03891; H04L 25/03038; H04L 25/03057; H04L 2025/03617; H04L 2025/03477; H03H 21/0012
USPC ........................... 375/260, 229, 232
See application file for complete search history.

(56) References Cited

U.S. PATENT DOCUMENTS

| 6,246,732 B1* | 6/2001 | Kobayashi et al. ........... 375/346 |
| 7,356,100 B2* | 4/2008 | Molisch et al. ............... 375/343 |
| 7,580,453 B2 | 8/2009 | Chang et al. |
| 2003/0086515 A1* | 5/2003 | Trans et al. .................... 375/346 |

(Continued)

FOREIGN PATENT DOCUMENTS

| EP | 2485402 A2 | 8/2012 |
| WO | 2008/081714 A1 | 7/2008 |
| WO | 2009/120456 A2 | 10/2009 |

OTHER PUBLICATIONS

European Search Report regarding Application No. 13184587.7-1860; issued on Jul. 23, 2014 ; 6 pages.

Primary Examiner — Juan A Torres
(74) Attorney, Agent, or Firm — Cantor Colburn LLP

(57) ABSTRACT

Dynamically scheduling multi-receive-path signal equalizer tasks. An estimated maximum Doppler frequency and an estimated delay spread of a particular wireless communications channel may be determined at a particular time. A particular task queue format and a particular predictor model order update period may be identified based on the estimated maximum Doppler frequency and delay spread. A particular predictor model order update rate may be selected based on the identified particular equalizer task queue format. A plurality of task control signals may be generated based on the particular task queue format, the particular predictor model order-update period, and the particular predictor model order-search range, to control equalizer coefficient generation within a particular time period.

20 Claims, 8 Drawing Sheets

(56) References Cited

U.S. PATENT DOCUMENTS

| | | |
|---|---|---|
| 2008/0181292 A1 | 7/2008 | Yang et al. |
| 2009/0110048 A1 | 4/2009 | Luschi et al. |
| 2009/0111413 A1* | 4/2009 | Luschi et al. .................. 455/230 |
| 2009/0257578 A1 | 10/2009 | Shih et al. |
| 2011/0261873 A1 | 10/2011 | Kim et al. |

* cited by examiner ic
DYNAMIC TASK SCHEDULING FOR MULTI-RECEIVE-PATH EQUALIZER This is the U.S. national stage of application No. PCT/CN2013/071689, filed on 20 Feb. 2013.

BACKGROUND OF THE DISCLOSURE

Certain mobile networks may support particular communication protocols that allow for faster data transmission when compared to other protocols. For example, HSDPA (High-Speed Downlink Packet Access), or evolved HSDPA+, enabled mobile devices may realize higher data rates and capacity when compared to devices enabled to communicate via legacy WCDMA (Wideband Code Division Multiple Access). Such devices, however, may require relatively complex and expensive hardware architectures in order to realize faster data transmission.

SUMMARY

In one aspect, a method for dynamically scheduling multi-receive-path signal equalizer tasks is disclosed. The method may include determining an estimated maximum Doppler frequency and an estimated delay spread of a particular wireless communications channel at a particular time. The method may further include identifying a particular task queue format and a particular predictor model order update period based on the estimated maximum Doppler frequency and delay spread. The method may further include selecting a particular predictor model order update rate based on the identified particular equalizer task queue format. The method may further include generating a plurality of task control signals based on the particular task queue format, the particular predictor model order-update period, and the particular predictor model order-search range, to control equalizer coefficient generation within a particular time period.

In another aspect, a computer-implemented method is disclosed that may include, for example, acquiring an estimated maximum Doppler frequency (DF) and an estimated delay spread (DS) of a particular wireless communications channel at a particular point in time. The method may further include comparing the estimated maximum DF against a threshold DF, and the estimated DS against a threshold DS. The method may further include selecting, based on the comparing, a particular task queue format to control signal equalizer tasks of a particular mobile user equipment within a particular time period. The particular task queue format may specify, within the particular time period, at least one of an equalizer coefficient generation task for a first receive path and an equalizer coefficient generation task for a second receive path, and an equalizer order-search task for one of the first receive path and the second receive path.

In yet another aspect, a multi-receive-path signal equalizer for a mobile user equipment is disclosed. The equalizer may include an equalizer coefficient generator module configured to generate a first channel impulse response and a second channel impulse response. The equalizer may further include a first filter module configured to generate a first equalized output signal by convolution of a first input signal, of a first signal-receive path, with the first impulse response. The equalizer may further include a second filter module configured to generate a second equalized output signal by convolution of a second input signal, of a second signal-receive path, with the second impulse response. The equalizer may further include a task scheduler module configured to: acquire an estimated maximum Doppler frequency (DF) and an estimated delay spread (DS) of a particular wireless communications channel at a particular time; compare the estimated maximum DF against a threshold DF, and the estimated DS against a threshold DS; and select, based on the comparing, a particular task queue to control signal equalizer tasks of the equalizer coefficient generator module within a particular time period, the particular task queue specifying, within the particular time period, at least one of an equalizer coefficient generation task for the first signal-receive path and an equalizer coefficient generation task for the second signal-receive path, and an equalizer order-search task for one of the first signal-receive path and the second signal-receive path. The multi-receive-path signal equalizer may be configured to sum together the first equalized output signal and the second equalized output signal to form an equalized signal.

This Summary does not in any way limit the scope of the claimed subject matter.

BRIEF DESCRIPTION OF THE DRAWINGS

A further understanding of the nature and advantages of the present invention may be realized by reference to the remaining portions of the specification, and the drawings, wherein like reference numerals are used throughout to refer to similar components. In some instances, a sub-label may be associated with a reference numeral to denote one of multiple similar components. When reference is made to a reference numeral without specification to an existing sub-label, it is intended to refer to all such multiple similar components.

DETAILED DESCRIPTION OF THE DISCLOSURE

The present disclosure is directed to systems and methods for dynamically scheduling digital signal processing tasks for a multiple-receive-path equalizer. In general, the term "multiple," or "multi," or variations thereof, may refer to a number greater than or equal to one (1). For example, and depending on implementation, "multiple," or "multi," or variations thereof, may refer to any non-zero integer number value of "receive paths." In one embodiment, the equalizer may be incorporated within a wireless receiver of a particular mobile user equipment, and may at least be configured to mitigate signal degrading channel effects in wireless applications where the communication channel is time-varying. Although not so limited, an appreciation of the various aspects of the present disclosure will be gained through a discussion of the example(s) provided below.

Figure 1:
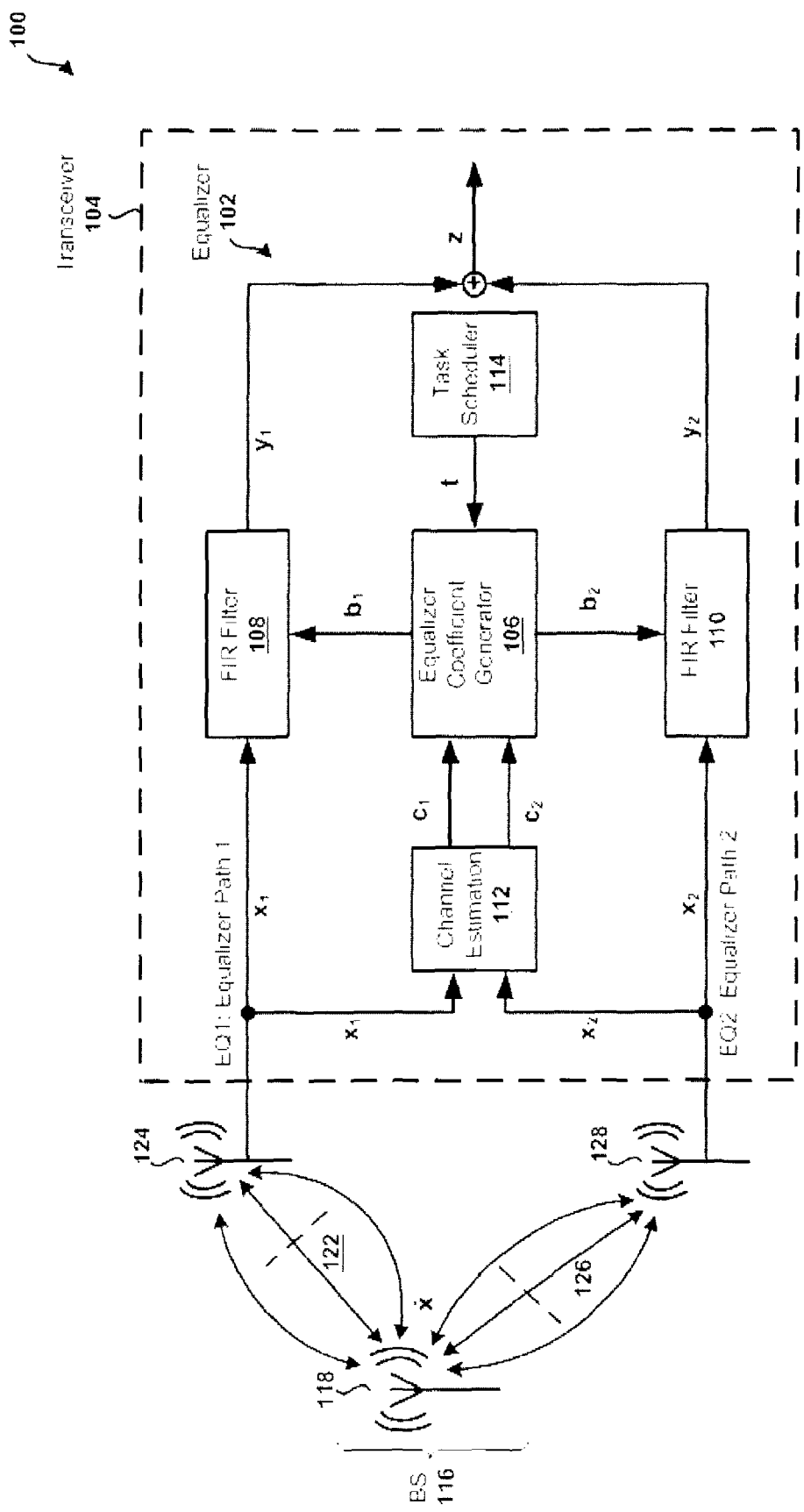
FIG. 1 shows a block diagram of an example system that includes a dual-receive-path equalizer in accordance with the principles of the present disclosure.

For example, referring now to FIG. 1, a block diagram of an example system 100 that includes a dual-receive-path equalizer 102 is shown in accordance with the principles of the present disclosure. The equalizer 102 is shown incorporated within a wireless receiver 104. For brevity, the example system 100 is depicted in a conceptual, simplified form. However, particular elements of the system 100 may generally include more or fewer other elements and/or the components as desired. Further, number and type of elements or components as incorporated within the system 100 may or may not be implementation specific.

In the present example, the equalizer 102 may include an ECG (Equalizer Coefficient Generator) module 106 that is in communication with a first FIR (Finite Impulse Response) filter module 108, a second FIR filter module 110, a channel estimation module 112, and a task scheduler module 114. As described in further detail below, the example task scheduler 114 may be configured to optimize performance of the equalizer 102 for time-varying wireless communication channels by dynamically assigning or scheduling various signal equalization tasks to be implemented by the ECG 106. In general, such tasks may be assigned or otherwise selected based upon certain scheduling criteria as a function of at least one particular parameter that characterizes or quantifies performance of communications within a multipath communication channel.

In practice, and without consideration of temporal aspects of signal flow, a signal ẋ may be transmitted by a BS (Base Station) 116 via a transmit antenna 118. The signal ẋ may propagate through a first communication multi-path wireless channel 122, and may be received by a first receive antenna 124 that is associated with the receiver 104. In this example, the antenna 124 may be incorporated within a particular user equipment (not shown) that houses the receiver 104. Similarly, the signal ẋ may propagate through a second communication multi-path wireless channel 126, and may be received by a second receive antenna 128 that houses the receiver 104. As described in further detail below, the example equalizer 102 may combine and process the respective signals ẋ as received by the receiver 104 in order to reverse, for example, multipath-related distortion effects incurred by transmission of the respective signal ẋ through the respective channels 122, 124. Such a signal distortion mitigation scheme may be, for example, implemented as part of a "receive antenna diversity" system, and may in one aspect improve quality and reliability of a communication link that is established between the BS 116 and the receiver 104. Other benefits are possible as well.

In the example of FIG. 1, the medium (e.g., atmosphere) of the channel 122 may be quite different to that of the channel 126. In particular, combined effects of various signal degrading phenomena such as, for example, scattering, fading, power decay with propagation distance, etc., may influence or otherwise distort the signal ẋ differently when the same propagates through the respective channels 122, 126. In addition, in a HSDPA implementation for example, which is based on CDMA techniques, intra-cell interference and/or inter-cell interference may influence or otherwise distort the signal ẋ differently, and may possibly affect system performance in terms of transmission speed and capacity. In at least one aspect, the example equalizer 102 is configured to mitigate such effects, and reconstruct data encoded within the signal ẋ in as a distortion-free manner as possible.

In particular, the example equalizer 102 may generate and sum together a first equalized output signal $y_1$ and a second equalized output signal $y_2$ to form an equalized signal z. The signal z may reproduce the data as contained within the original respective signals ẋ. For example, the signal $y_1$ may be generated by the FIR filter 108 via convolution of a first input signal $x_1$ (e.g., a digitized, at least slightly distorted version of the signal ẋ) with a first calculated impulse response $b_1$. Similarly, the signal $y_2$ may be generated by the FIR filter 110 via convolution of a second input signal $x_2$ (e.g., a digitized, at least slightly distorted version of the signal ẋ) with a second calculated impulse response $b_2$. Such an operation may, in this example, be further understood in view of the following, which models the output of a discrete-time FIR filter as a weighted sum of a current input n, and finite number of previous inputs n-N:

$$y[n] = b_0 x[n] + b_1 x[n-1] + \cdots + b_N x[n-N] \quad\quad \text{Equation 1}$$

$$= \sum_{i=0}^{N} b_i x[n-i]$$

With reference to signal flow of FIG. 1, the parameter N within Equation 1 may be a positive integer value that may correspond to an "order" of the FIR filter 108, or the FIR filter 110. The term x[n] may represent a finite digitized sequence of the signal $x_1$, or the signal $x_2$, and the term y[n] may represent a finite digitized sequence of the signal $y_1$, or the signal $y_2$, respectively. The term $b_1$ may represent a finite series of equalizer coefficients that are associated with the FIR filter 108 in the Equalizer Receive-Path 1, while the term $b_2$ may represent a finite series of equalizer coefficients that are associated with the FIR filter 110 in the Equalizer Receive-Path 2. In one embodiment, the ECG 106 may calculate respective equalizer coefficients $b_1$ as a function of channel estimates $c_1$ that may be provided by the channel estimation 112. The ECG 106 may also calculate respective equalizer coefficients $b_2$ as a function of channel estimates $c_2$ that may be provided by the channel estimation 112. In general, the channel estimates $c_1$ or $c_2$ may be calculated as a function of the signal $x_1$ or $x_2$. In this manner, the equalized signal z may be generated at least based on channel state information associated with the channels 122, 126.

In general, respective equalizer coefficients $b_1$ or $b_2$ may be calculated based on, or in accordance with, some criterion, such as a particular estimation scheme. For example, a LMMSE (Linear Minimum Mean Square Error) estimation scheme may be used in tandem with the channel estimates $c_1$ or $c_2$ to calculate respective equalizer coefficients $b_1$ or $b_2$. Such an example implementation may minimize mean square error between the signal ẋ and the signal $y_1$, or between the signal ẋ and the signal $y_2$, respectively. In another example, a LP (Linear Prediction) estimation scheme may be used in tandem with the channel estimates $c_1$ or $c_2$ to calculate respective equalizer coefficients $b_1$ or $b_2$. Such an implementation may enable estimation of respective equalizer coefficients $b_1$ or $b_2$ by minimizing prediction error based on autoregressive modeling of the signal $x_1$ or $x_2$. In both scenarios, however, certain aspects of the respective estimation scheme may be computationally intensive or expensive. This may, in turn, potentially affect performance of the equalizer 102.

For example, performance of the equalizer 102 may be sensitive to choice of matrix size, or channel "model order" in a Cholesky decomposition, which may be used to realize matrix inversion in the LMMSE estimation scenario. Here, inefficiencies and possibly a perceivable degradation in performance may manifest with increasing matrix size due to increasing computational resources required to implement matrix inversion. In another example, performance of the equalizer 102 may be sensitive to choice of autoregression "model order" in a Levinson-Durbin recursive solution, which may be used to realize autoregression in the LP estimation scenario. Here, computational complexity may vary as a power law with channel length, e.g., $O(L^2)$ where L is the channel length, and inefficiencies and possibly a perceivable degradation in performance may occur with increasing "L."

In both of the example LMMSE and LP scenarios, performance of the equalizer 102 may be sensitive to a "chosen" model order. Further, when a chosen model order is less than a "true" or "correct" model order, an "under-modeled" error may manifest where predictor error is not well decorrelated, and may be more than an optimal minimum. And, when the chosen model order is greater than a true or correct model order, an "over-modeled" error may manifest that may introduce an ill-conditioned matrix equation, unreliable numerical solution, and extra computational burden. In one example implementation, a procedure or task for determining or selecting a particular model order to be used in a particular estimation scheme (i.e., selecting a chosen model order) may include listing all possible model orders, and calculating corresponding error powers. In this example, and as described in further detail below, a candidate with a minimal error power may be chosen as a correct or optimal chosen model order.

As may be understood from the preceding description, the equalizer 102 of the present disclosure may be required to implement a number of tasks in the process of generating the equalized signal z, where some of the tasks may potentially be computationally expensive or intensive. One example task in accordance with the present disclosure may correspond to calculating equalizer coefficients based on a chosen model order, which itself may be defined in terms of an implementation-specific estimation scheme. In this example, calculation of respective equalizer coefficients may be referred to as an ECC (Equalizer Coefficient Calculation) task. Another example task in accordance with the present disclosure may correspond to performing a model order search task to identify or select a true or correct chosen model order, as precisely as possible. In this example, performing a search or selection to determine a true or correct chosen model order may be referred to as an EOS (Equalizer Order Search) task. As described throughout, the example task scheduler 114 may be configured to dynamically schedule at least ECC tasks and EOS tasks for the equalizer 102 to implement, for the purpose of optimizing and/or maximizing performance of the equalizer 102.

Figure 2:
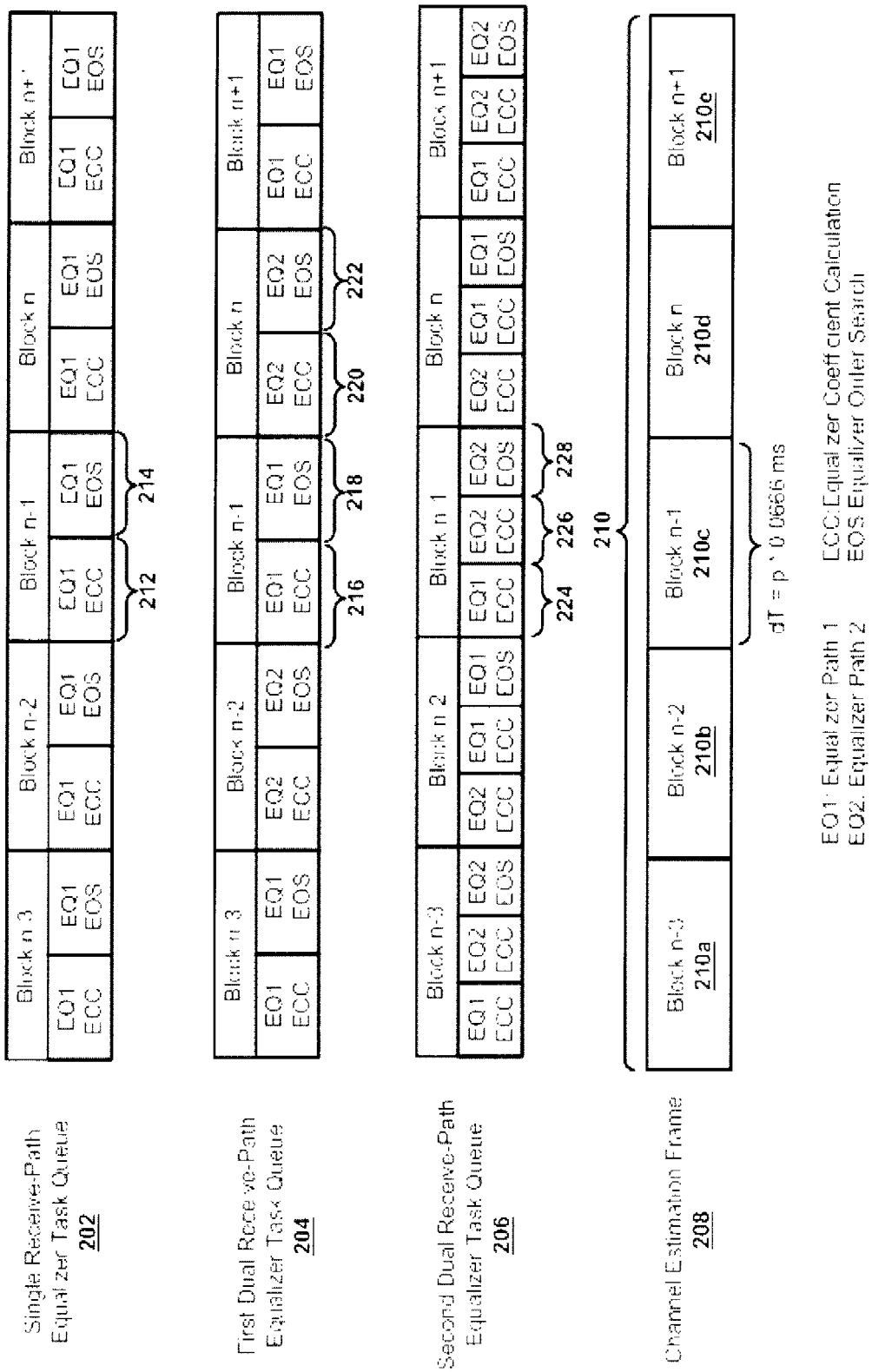
FIG. 2 shows an example single-receive-path equalizer task queue, a first example dual-receive-path equalizer task queue, and a second example dual-receive-path equalizer task queue.

For example, referring now to FIG. 2, an example single-receive-path equalizer task queue 202, a first example dual-receive-path equalizer task queue 204, and a second example dual-receive-path equalizer task queue 206 are shown. Also shown is a channel estimation frame 208 that comprises a plurality of blocks 210a-e (collectively, "blocks 210"). In general, the blocks 210 may represent how often the channel estimates c as shown on FIG. 1 are updated or otherwise calculated from the respective signals $x_1$, $x_2$. For example, a time or duration dT of each of the plurality of blocks 210a-e may be proportional to a predetermined number of "chips," where a "chip" may be a single symbol or pulse, having a particular pulse length, of a direct-sequence spread spectrum code. For example, in WCDMA, channel estimation is based on the CPICH symbol, whose length may correspond to 256 chips, or about 0.0666 milliseconds in terms of temporal duration. Thus, in one embodiment, the time or duration dT of the respective blocks 210 may be chosen as a multiple of the unit of 256 chips. This may be expressed, for example, as dT=p*0.0666 milliseconds, where p is a positive integer value. Other embodiments are possible.

The example task scheduler 114 may be configured to dynamically schedule various tasks as a function of, or in accordance with, particular timing associated with duration of the blocks 210. Such tasks may be arranged in a particular form or format distinct to each one of the respective task queues 202, 204, 206. The ECG 106 may then implement such tasks within a particular time or time-frame in accordance with sequencing of particular operations as defined by the respective task queues 202, 204, 206. For example, with initial reference to FIG. 1, a single-receive-path equalizer in accordance with the present disclosure may comprise of the ECG 106, the FIR filter 108, the channel estimation 112, and the task scheduler 114. A receiver path associated with these components may be referred to as EQ1 (Equalizer Path 1). In this example, it is envisioned that the FIR filer 110 is absent from the equalizer 102, and that the signal $x_2$ is not supplied to the channel estimation 112. Accordingly, the equalized signal z may generally correspond to the signal $y_1$.

Referring now back to FIG. 2, the example task queue 202 may be understood in that a single ECC task, and a single EOS task, is scheduled to occur for the receiver path EQ1 within a particular time period within at least each one of the blocks 210. For example, a particular ECC task associated with the receiver path EQ1 may be scheduled to be performed within a time period 212 of block 210c, and a particular EOS task associated with path EQ1 may be scheduled to be performed within a proceeding time period 214 of block 210c. In one embodiment, the task scheduler 114 may schedule the particular ECC and EOS tasks as shown within block 210c during or at a time period prior to the block 210c. For example, the task scheduler 114 may determine that the particular ECC task and particular EOS task should be scheduled to block 210c at some point in time during the immediately preceding block 210b. In another embodiment, the task scheduler 114 may schedule the particular ECC and EOS tasks as shown within block 210c in substantially real-time, or an actual time during which the scheduling takes place. For example, the task scheduler 114 may determine that the particular ECC task and particular EOS task should be scheduled to block 210c at some point in time at or during block 210c. Still other embodiments are possible.

In the evolving 3GPP standards for wireless communication, a number of different HSDPA receivers have been defined to enable particular mobile user equipment to realize increasingly higher data rates and capacity. For example, the 3GPP standards define a "type 3" receiver that is configured to exhibit so-called receive antenna diversity, as well as chip level equalization, to realize increasingly higher data transmission speeds. In this example, however, relatively complex hardware architectures may be required to implement an equalizer coefficient generator module that is configured to calculate equalizer coefficients based on a particular estimation scheme (e.g., Cholesky, Levinson-Durbin, etc.). The cost associated with such hardware architectures may prohibit incorporation of associated hardware into lower-end mobile user equipment. The present disclosure addresses these and other issues by using a single instance of an equalizer coefficient generator module (e.g., ECG 106) to serve multiple signal receive paths (e.g., EQ1 and EQ2), where a task scheduler module (e.g., task scheduler 114) enables a particular equalizer (e.g., equalizer 102) to achieve an equalization performance similar to a system with multiple instances of an equalizer coefficient generator module. Accordingly, it is contemplated that such a system may be incorporated into relatively "lower-end" mobile user equipment, without prohibitively raising the price point of such user equipment from the consumer perspective. Such an implementation may be understood in reference to the task queue 204 and the task queue 206 as shown in FIG. 2.

For example, with initial reference to FIG. 1, a dual-receive-path equalizer (i.e. equalizer 102) in accordance with the present disclosure may comprise of a single instance of the ECG 106, the FIR filter 108, the FIR filter 110, the channel estimation 112, and the task scheduler 114. A receiver path associated with the ECG 106, the FIR filter 108, the channel estimation 112, and the task scheduler 114 may be referred to as EQ1 (Equalizer Path 1). A receiver path associated with the ECG 106, the FIR filter 110, the channel estimation 112, and the task scheduler 114 may be referred to as EQ2 (Equalizer Path 2). Here, the equalized signal z may correspond to a sum of the respective signals $y_1$, $y_2$.

Referring now back to FIG. 2, the task queue 204 and the task queue 206 may be understood.

First, the task queue 204 may be understood in that a single receiver path, EQ1 or EQ2, is served within each particular one of the blocks 210. For example, a particular ECC task associated with the receiver path EQ1 may be scheduled to be performed within a time period 216 of block 210c, and a particular EOS task associated with the receiver path EQ1 may be scheduled to be performed within a proceeding time period 218 of block 210c. Additionally, a particular ECC task associated with the receiver path EQ2 may be scheduled to be performed within a time period 220 of block 210d, and a particular EOS task associated with the receiver path EQ2 may be scheduled to be performed within a proceeding time period 222 of block 210d. In this manner, the receiver paths EQ1, EQ2 are served in an alternating fashion in accordance with the scheduled sequencing of the task queue 204. Such an implementation may be beneficial in many respects. For example, its advantage is that more order candidates can be done in EOS task in each block. However, in the task queue 204, equalizer coefficient update of each of the receiver paths EQ1, EQ2 takes two blocks.

Second, the task queue 206 may be understood in that a single ECC task is scheduled to occur for both of the receiver paths EQ1, EQ2 within a particular time period within each one of the blocks 210. Additionally, a single EOS task is scheduled to occur for one of the receiver paths EQ1, EQ2 within a particular time period within each one of the blocks 210. For example, a particular ECC task associated with the receiver path EQ1 may be scheduled to be performed within a time period 224 of block 210c, a particular ECC task associated with the receiver path EQ2 may be scheduled to be performed within a proceeding time period 226 of block 210c, and a particular EOS task associated with the receiver path EQ2 may be scheduled to be performed within a proceeding time period 228 of block 210c. In this manner, both receiver paths EQ1 and EQ2 are served within each of the blocks 210. Further, a single EOS task is performed for only one of the receiver paths EQ1 and EQ2 within each of the blocks 210. Such an implementation may be beneficial in many respects.

For example, the order-search task is done for only one equalizer path due to the consideration of the trade-off between the cost and the computation power of the handset equalizer module. In particular, the equalizer order-search (EOS) task in one block follows the equalizer coefficient-calculation (ECC) task for the corresponding equalizer path. Its advantage is that the EOS task can share some intermediate results conducted in the previous ECC task. For example, the computation of the sample correlation matrix in LMMSE-based or LP-based equalization algorithm can be saved. In general, the computational complexity is relative high, i.e., $O(L^2)$ where L is the channel length. In return, more order candidates can be done in EOS task.

In other words, for task queue 206, the pattern |EQ1 ECC>EQ2 ECC>EQ2 EOS|>|EQ2 ECC>EQ1 ECC>EQ1 EOS|> etc., may be more efficient than another pattern which also has three tasks, such as an example first pattern |EQ1 ECC>EQ2 ECC>EQ1 EOS|>|EQ1 ECC>EQ2 ECC>EQ2 EOS|> etc., or an example second pattern|EQ1 ECC>EQ2 ECC>EQ1 EOS|>|EQ2 ECC>EQ1 ECC>EQ2 EOS|>.... In particular, when EQ1 EOS follows EQ2 ECC, or when EQ2 EOS follows EQ1 ECC, intermediate results of EQ2/1 ECC cannot be used for EQ1/2 EOS. For example, the following structure cannot share intermediate results EQ2 ECC>EQ1 EOS (first pattern), or EQ2 ECC>EQ1 EOS and EQ1 ECC>EQ2 EOS (second pattern).

The task queue 204 and the task queue 206 may be further understood as follows:

Where,
Time_EQ1_ECC=Time_EQ2_ECC=Time_EQ_ECC; and
Time_EQ1_EOS=Time_EQ2_EOS=Time_EQ_EOS.
In task queue 204: Time_block=Time_EQ_ECC+Time_EOS_204.
In task queue 206: Time_block=2*Time_EQ_ECC+Time_EOS_206.

By defining an averaged EOS task UNIT_TIME_EOS, the number of more EOS candidates in task queue 204 (e.g., "more order candidates can be done in EOS task in each block") may be calculated as:
(Time_EOS_204−Time_EOS_206)/UNIT_TIME_EOS=
Time_EQ_ECC/UNIT_TIME_EOS.

As may be understood from the preceding description, the example task scheduler 114 may be configured to optimize performance of the equalizer 102 for time-varying wireless communication channels by dynamically assigning signal equalization tasks, such as ECC tasks and EOS tasks, to be implemented by the ECG 106 at particular points in time. In general, and as described below in connection with FIGS. 3-5, such tasks may be assigned or otherwise selected based upon certain scheduling criteria as a function of parameters that characterize performance of communications within a multipath communication channel. In accordance with the present disclosure, such parameters may be preferentially selected based on particular relationships between the parameters and a particular multipath communication channel.

For example, and as discussed below in connection with FIGS. 3-5, the following parameters/relationships may be leveraged for the purpose of maximizing performance of the equalizer 102. First, the relationship between maximum Doppler Frequency magnitude and changes in a particular mobile communication channel is approximately proportional. For example, when maximum Doppler Frequency due to relative movement between a particular base station and mobile user equipment is relatively "small" or "low," the associated wireless channel may change relatively slowly in a particular period of time. In contrast, when maximum Doppler Frequency due to relative movement between the particular base station and mobile user equipment is relatively "large" or "high," the associated wireless channel may change significantly in the particular period of time.

Second, the relationship between delay spread and a confidence factor that quantifies whether a particular multipath signal component will fall within a current channel estimate window is approximately proportional. For example, in scenarios when delay spread is relatively "small" or "low," strongest multipath signal components may most likely fall in a current channel estimate window with a relatively high probability. In contrast, when delay spread becomes relatively "large" or "high," strongest multipath signal components may "slide out" of the current channel estimate window with a relatively high probability. Other channel parameters may be leveraged for the purpose of optimizing performance of the equalizer 102 as well.

Figure 3:
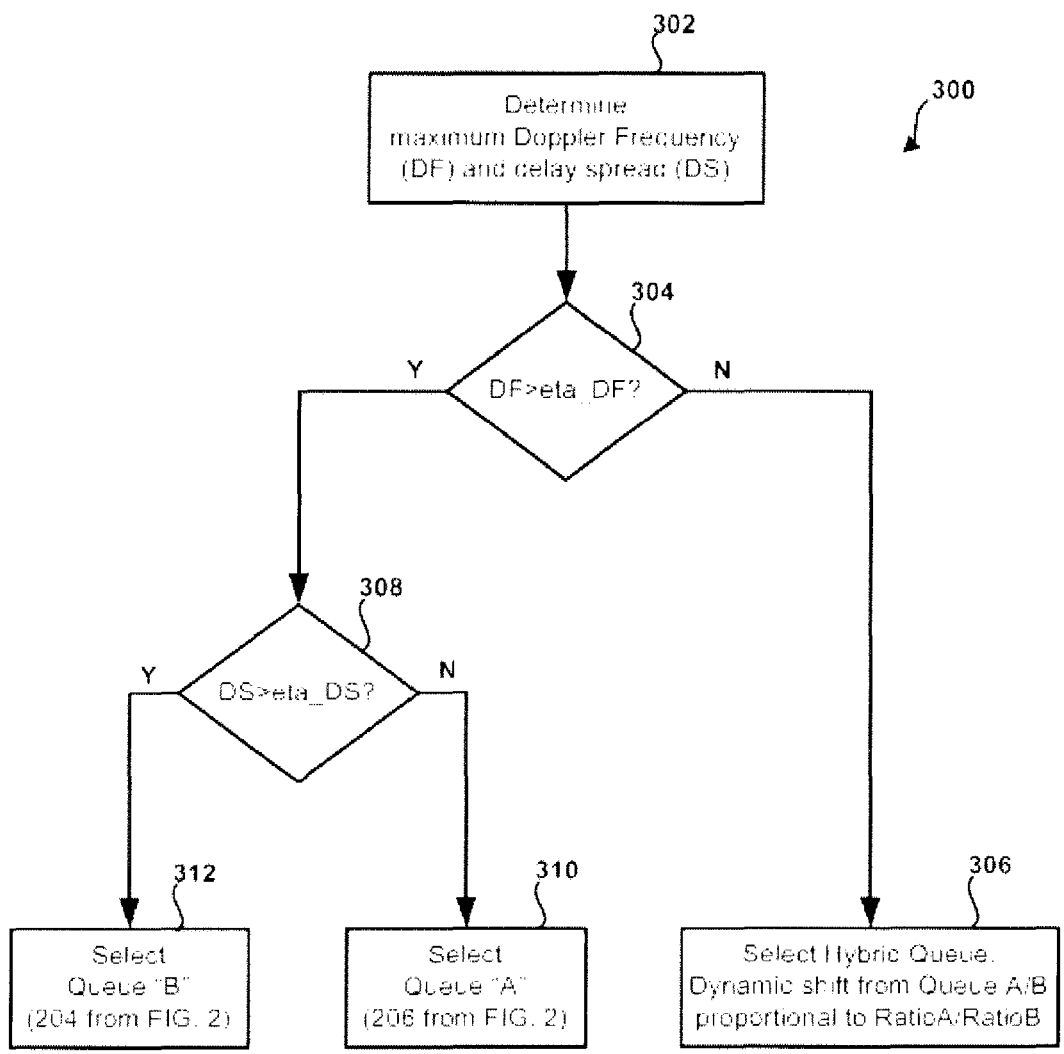
FIG. 3 shows an example method for selecting a particular equalizer scheduling task queue as a function of maximum Doppler frequency and delay spread.

Referring now to FIG. 3, an example method 300 for selecting a particular equalizer scheduling task queue as a function of maximum Doppler frequency and delay spread is shown. Example operations of the method 300 of FIG. 3 may be implemented on or by the task scheduler 114 as discussed above in connection with FIGS. 1-2. However, other embodiments are possible. For example, certain operations of the example method 300 of FIG. 3 may be implemented on or by one or more other elements of the system 100 as discussed above. The method 300 begins at an operation 302. At operation 302, the task scheduler 114 may acquire or otherwise calculate an estimated maximum Doppler frequency (DF), and an estimated delay spread (DS), of a particular wireless communications channel (e.g., channel 122, channel 126) at a particular point in time. The task scheduler 114 may further acquire or calculate, at operation 302, a threshold Doppler frequency (eta_DF) and a threshold delay spread (eta_DS). As discussed below, the threshold Doppler frequency and threshold delay spread may be used as parameters to control process flow within the example method 300.

Process flow proceeds to an operation 304. At operation 304, the task scheduler 114 may compare the estimated maximum Doppler frequency against the threshold Doppler frequency. Here, based on the comparison, the task scheduler 114 may determine whether a "current" maximum Doppler frequency is relatively large or high (i.e., DF>eta_DF), where the particular wireless communications channel may change significantly in a particular period, or is relatively small or low (i.e., DF<eta_DF), where the particular wireless communications channel may change relatively slowly in the particular period.

Process flow branches to an operation 306 when it is determined that the estimated maximum Doppler frequency is less than the threshold Doppler frequency (i.e., DF<eta_DF), as discussed further below. Process flow branches to an operation 308 when it is determined that the estimated maximum Doppler frequency is greater than the threshold Doppler frequency (i.e., DF>eta_DF). In some embodiments, process flow may branch to the operation 308 when it is determined that the estimated maximum Doppler frequency is approximately equal to the threshold Doppler frequency (i.e., DF~eta_DF). Other embodiments are possible.

Referring now to operation 308. At operation 308, the task scheduler 114 may compare the estimated delay spread against the threshold delay spread. Here, based on the comparison, the task scheduler 114 may determine whether a "current" delay spread is relatively large or high (i.e., DS>eta_DS), where strongest multipath signal components may slide out of a current channel estimate window with a relatively high probability, or relatively small or low (i.e., DS<eta_DS), where strongest multipath components may most likely fall in the current channel estimate window.

Process flow branches to an operation 310 when it is determined that the estimated delay spread is less than the threshold delay spread (i.e., DS<eta_DS), as discussed further below. Process flow branches to an operation 312 when it is determined that the estimated delay spread is greater than the threshold delay spread (i.e., DS>eta_DS). In some embodiments, process flow may branch to the operation 312 when it is determined that the estimated delay spread is approximately equal to the threshold delay spread (i.e., DS~eta_DS). Other embodiments are possible. Further, delay spread threshold, which may be used to switch (see operation 308) between "Queue A" (see operation 310) and "Queue B" (see operation 312) may depend inversely on Doppler frequency. For example, for a "smaller" or "lower" Doppler frequency, delay spread threshold may be chosen relative "large." In this example, eta_DS may be defined as, eta_DS=fun_eta(DS).

Referring now to operation 312. At operation 312, the task scheduler 114 may select the task queue 204 as a preferred signal equalization task schedule to be implemented by the ECG 106. In contrast, referring now to operation 310, the task scheduler 114 may select the task queue 206 as a preferred signal equalization task schedule to be implemented by the ECG 106. The ECG 106 may then implement such tasks within a particular time or time-frame in accordance with sequencing of particular tasks as defined by the respective task queues 204, 206. In this manner, within the example process flow of FIG. 3, signal equalization tasks may be assigned or otherwise selected based upon certain scheduling criteria as a function of parameters that characterize performance of communications within a multipath communication channel.

Referring momentarily back to operation 312, here, as strongest paths may have a higher probability to slide out of a current channel estimate window, it may be desirable to perform an increasing number of order-search tasks used for the tracking of a channel window. In contrast, referring now to operation 310, as strongest paths may most likely stay in a current channel estimate window, updating equalizer coefficients in a real-time manner may provide an increasingly better equalization performance.

Referring now back to operation 304, as mentioned above, process flow branches to the operation 306 when it is determined that the estimated maximum Doppler frequency is less than the threshold Doppler frequency (i.e., DF<eta_DF). At operation 306, the task scheduler 114 may select a "hybrid queue" as a preferred signal equalization task schedule to be implemented by the ECG 106. For example, the task scheduler 114 may switch between task queue 204 and task queue 206 periodically in a "hybrid queue" implementation. In this example, according to an APE (Accumulated Power Error) of a chosen model order candidate in each of the respective task queues 204, 206, the task scheduler 114 may assign a higher task percentage to a preferred one of the task queues 204, 206 in a following assignment. Here, the APE may be calculated by using a channel estimate and respective equalizer coefficients. A percentage of use of a particular one of the task queues 204, 206 may be adjusted dynamically according to APE value. In particular, a ratio of the assigned percentage of task queue usage may be set as: Ratio_A: Ratio_B=sqrt (APE_A): sqrt(APE_B), where the variable "A" may refer to the task queue 206 and the variable "B" may refer to the task queue 204. Other embodiments are possible.

Figure 4:
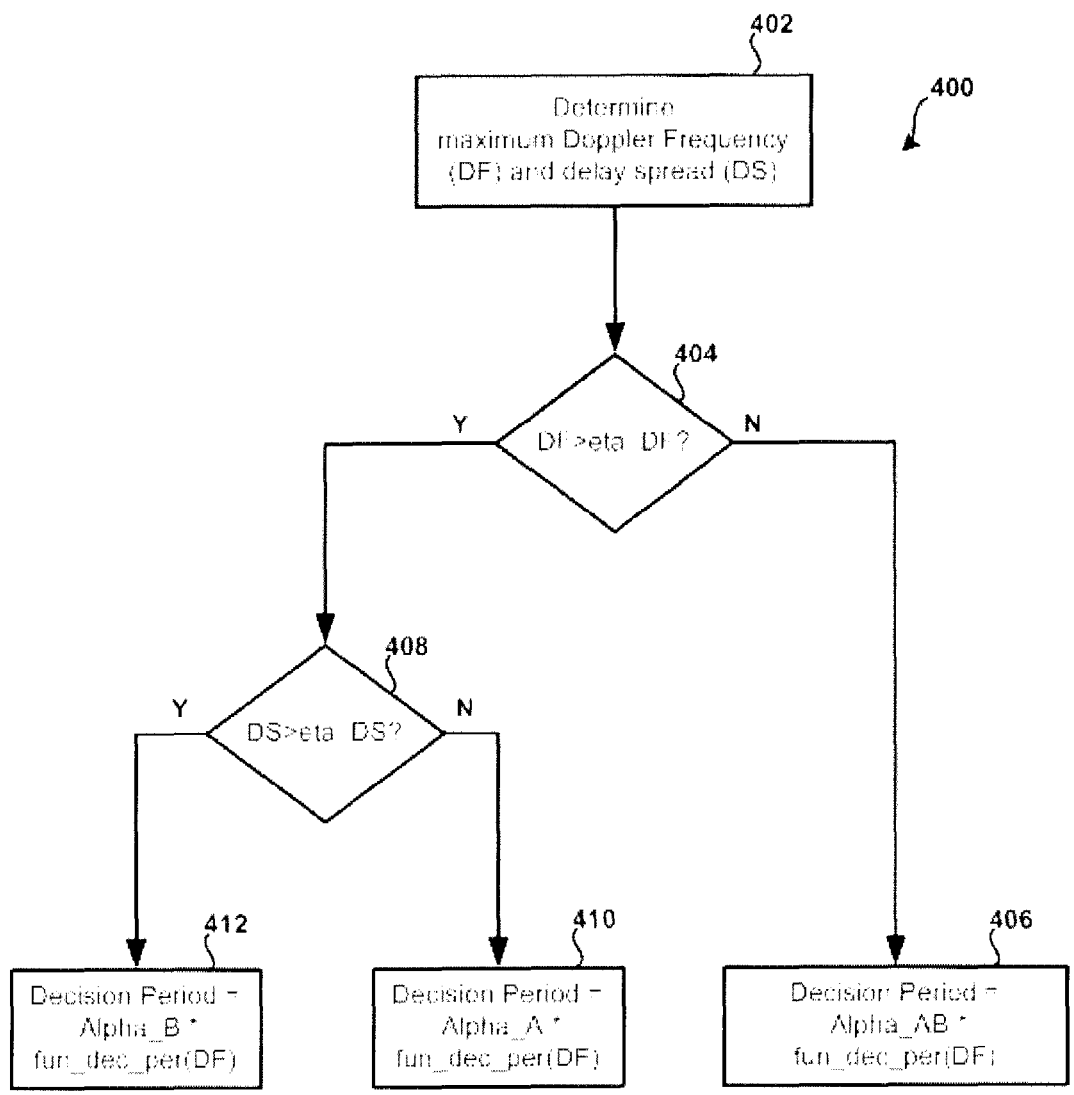
FIG. 4 shows an example method for selecting a time period to update a model order that is used for a particular equalizer coefficient calculation task as a function of maximum Doppler frequency and delay spread.

FIG. 4 shows an example method 400 for selecting a time period to update a model order that is used for a particular ECC task as a function of maximum Doppler frequency and delay spread. Example operations of the method 400 of FIG. 4 may be implemented on or by the task scheduler 114 as discussed above in connection with FIGS. 1-2. However, other embodiments are possible. For example, certain operations of the example method 400 of FIG. 4 may be implemented on or by one or more other components of the system 100 discussed above.

The example method 400 of FIG. 4 is similar to the example method 300 of FIG. 3 in many respects. For example, "order update rate" as described in connection with FIG. 4 is changed according to estimated maximum Doppler frequency and delay spread values. In the method 400 of FIG. 4, however, order update rate may correspond to a period used to update a selected order for a particular ECC task, based on estimated power errors of all model order candidates. Additionally, when it is determined that the estimated maximum Doppler frequency is greater than the threshold Doppler frequency (i.e., DF>eta_DF), a decision period for APE value(s) may be set to a relatively "small" or "low" value, which may correspond to a relatively "fast" order update rate. In one embodiment, a "decision period" may have unit(s) of "block," and "changing period" may have unit(s) of "blocks." Other embodiments are possible.

The method 400 begins at an operation 402. At operation 402, the task scheduler 114 may calculate an estimated maximum Doppler frequency (DF), and an estimated delay spread (DS), of a particular wireless communications channel (e.g., channel 122, channel 126) at a particular point in time. The task scheduler 114 may further calculate, at operation 402, a threshold Doppler frequency (eta_DF) and a threshold delay spread (eta_DS). Other embodiments are possible. For example, DF, DS, eta_DF, and eta_DS may be obtained directly from operation 302, as discussed above in connection with FIG. 3. As discussed below, the threshold Doppler frequency and threshold delay spread may be used as parameters to control process flow within the example method 400.

Process flow proceeds to an operation 404. At operation 404, the task scheduler 114 may compare the estimated maximum Doppler frequency against the threshold Doppler frequency. Here, based on the comparison, the task scheduler 114 may determine whether a "current" maximum Doppler frequency is relatively large or high (i.e., DF>eta_DF), where the particular wireless communications channel may change significantly in a particular period, or is relatively small or low (i.e., DF<eta_DF), where the particular wireless communications channel may change relatively slowly in the particular period.

Process flow branches to an operation 406 when it is determined that the estimated maximum Doppler frequency is less than the threshold Doppler frequency (i.e., DF<eta_DF). Process flow branches to an operation 408 when it is determined that the estimated maximum Doppler frequency is greater than the threshold Doppler frequency (i.e., DF>eta_DF). In some embodiments, process flow may branch to the operation 408 when it is determined that the estimated maximum Doppler frequency is approximately equal to the threshold Doppler frequency (i.e., DF~eta_DF). Other embodiments are possible.

Referring now to operation 408. At operation 408, the task scheduler 114 may compare the estimated delay spread against the threshold delay spread. Here, based on the comparison, the task scheduler 114 may determine whether a "current" delay spread is relatively large or high (i.e., DS>eta_DS), where strongest multipath signal components may slide out of a current channel estimate window with a relatively high probability, or relatively small or low (i.e., DS<eta_DS), where strongest multipath components may most likely fall in the current channel estimate window.

Process flow branches to an operation 410 when it is determined that the estimated delay spread is less than the threshold delay spread (i.e., DS<eta_DS). Process flow branches to an operation 412 when it is determined that the estimated delay spread is greater than the threshold delay spread (i.e., DS>eta_DS). In some embodiments, process flow may branch to the operation 412 when it is determined that the estimated delay spread is approximately equal to the threshold delay spread (i.e., DS~eta_DS). Other embodiments are possible.

Referring now to operation 412, which may correspond to selection of the task queue 204 within the example method 300, the task scheduler 114 may select a relatively fast order update rate (e.g., faster than that selected at operation 410, discussed further below) to be implemented by the ECG 106. In this example, the selected order update rate may be of the form: Decision Period=Alpha_B*fun_dec_per(DF), where "Alpha_B" is a relatively small or low value, and the variable "B" may refer to the task queue 204. In contrast, referring now to operation 410, which may correspond to selection of the task queue 206 within the example method 300, the task scheduler 114 may select a relatively slow order update rate because a number of EOS tasks associated with the task queue 206 to be implemented by the ECG 106 is greater than a number of EOS tasks associated with the task queue 204. In this example, the selected order update rate may be of the form: Decision Period=Alpha_A*fun_dec_per(DF), where "Alpha_A" is a relative large value, the variable "A" may refer to the task queue 206, and the expression "fun_dec_per(DF)" is a factor function of decision period as to estimated maximum Doppler frequency.

Referring now back to operation 404, as mentioned above, process flow branches to the operation 406 when it is determined that the estimated maximum Doppler frequency is less than the threshold Doppler frequency (i.e., DF<eta_DF). At operation 406, which corresponds to selection of a "hybrid queue" within the example method 300, the selected order update rate may be of the form: Decision Period=Alpha_AB*fun_dec_per(DF), where the variable "Alpha_AB" is a numerical value between "Alpha_A" and "Alpha_B." Note that fun_dec_per(DF) gives a much larger value when DF<eta_DF than the value when DF>eta_DF. Thus, the resulting decision period calculated in 406 for the case of DF<eta_DF might be larger than that calculated in 410 or 412 for the case of DF>eta_DF. In the other words, a resulting decision period for APE for each hypothesis from 406 may be a "large" value, or a "slow" order update rate.

Figure 5:
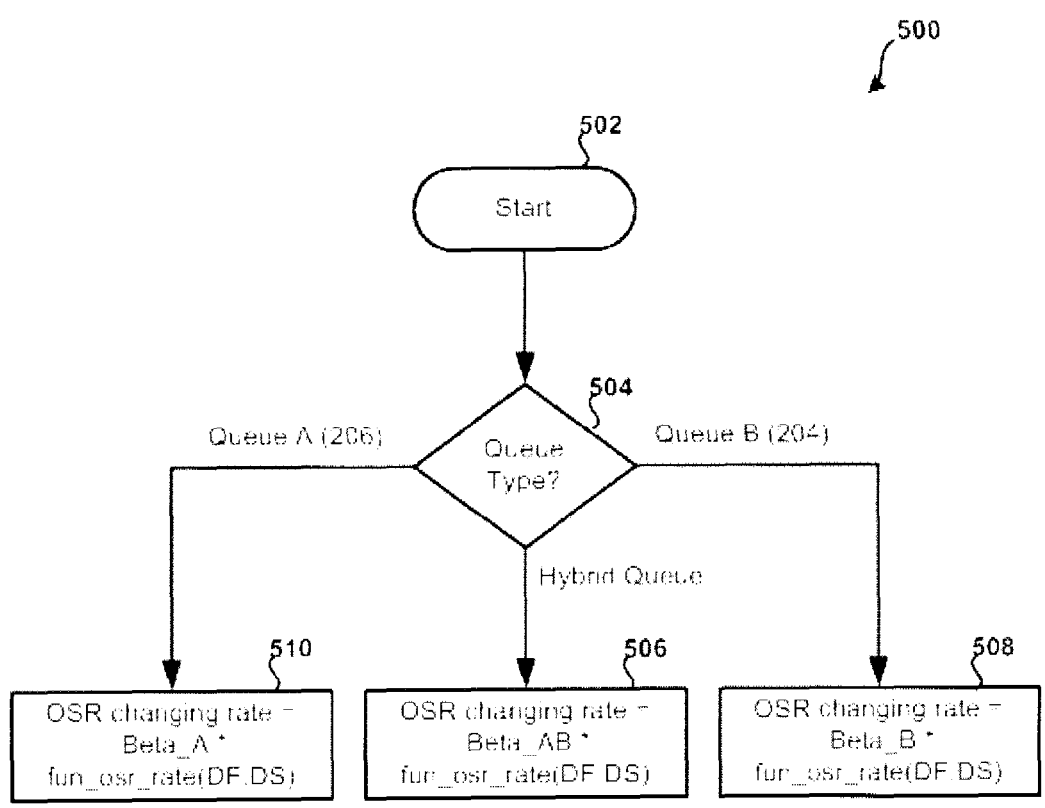
FIG. 5 shows an example method for selecting model order-search range changing rate as a function of maximum Doppler frequency and delay spread.

FIG. 5 shows an example method 500 for selecting model OSR (Order-Search Range) changing rate as a function of maximum Doppler frequency and delay spread. Example operations of the method 500 of FIG. 5 may be implemented on or by the task scheduler 114 as discussed above in connection with FIGS. 1-2. However, other embodiments are possible. For example, certain operations of the example method 500 of FIG. 5 may be implemented on or by one or more other elements of the system 100 discussed above.

The example method 500 of FIG. 5 is similar to the example method 300 of FIG. 3 in many respects. For example, process flow within the example method 500 of FIG. 5 may be controlled as a function of maximum Doppler frequency and delay spread. This is because process flow within the method 500 is controlled as a function of selection of a particular equalizer scheduling task queue (see FIG. 3). In FIG. 5, however, OSR is dynamically updated according to estimated maximum Doppler frequency and delay spread values, where OSR changing rate may be defined as the inverse of the number of blocks (e.g., in units of blocks 210) to change model order-search range. In particular, the OSR changing rate is updated as shown in FIG. 5 as: OSR changing rate=(relaxation factor)*fun_osr_rate(DF, DS), where the variable "relaxation factor" may be a positive integer value selected from one of "Beta_A" or "Beta_B" or "Beta_AB," where Beta_B<Beta AB<Beta_A, and where the variable "A"

may refer to the task queue 206, the variable "B" may refer to the task queue 204, and the variable "AB" may refer to the "hybrid queue" as discussed above.

OSR may be a central parameter that determines complexity of each task implemented by the ECG 106. For example, OSR may determine a number of model order-search tasks that may performed in each of the blocks 210 as shown in FIG. 2. In this example, OSR may be of the form: OSR=[1, . . . , $K_{OSR}$], where $K_{OSR}$=fun_osr_val(DF, DS), and "fun_osr_val (DS)" is a factor function determined by a value for estimated delay spread. In general, "$K_{OSR}$" is proportional to estimated delay spread, for example, "$K_{OSR}$" increases with an increasing estimated delay spread value.

The method 500 begins at a start operation 502. Process flow then proceeds to an operation 504. At operation 504, the task scheduler 114 may determine which one of the "queue A" or "queue B" or "hybrid queue" has been, or is currently being, selected by the task scheduler 114 as described above in connection with process flow of the example method 300 of FIG. 3.

Process flow within the method 500 branches to an operation 506 when it is determined the "hybrid queue" has been, or is currently being, selected by the task scheduler 114. Process flow within the method 500 branches to an operation 508 when it is determined the "queue B" has been, or is currently being, selected by the task scheduler 114. Process flow within the method 500 branches to an operation 510 when it is determined the "queue A" has been, or is currently being, selected by the task scheduler 114.

At operation 510, the OSR changing rate is updated as: OSR changing rate=(Beta_A)*fun_osr_rate(DF, DS). In this example, the variable "A" may refer to the task queue 206. In the task queue 206, as less order-search tasks (EOS tasks) are assigned, the order estimate may be less reliable. In this example, to keep a nominal confidence of order estimate, the relaxation factor may be assigned as a relatively "large" or "high" value, Beta_A.

At operation 508, the OSR changing rate is updated as: OSR changing rate=(Beta_B)*fun_osr_rate(DF, DS). In this example, the variable "B" may refer to the task queue 204. In the task queue 204, as more order-search tasks (EOS tasks) are assigned, the order estimate may be more reliable. In this example, to keep a nominal confidence of order estimate, the relaxation factor may be assigned as a relatively "small" or "low" value, Beta_B.

At operation 506, the OSR changing rate is updated as: OSR changing rate=(Beta_AB)*fun_osr_rate(DF, DS). In this example, the variable "A" may refer to the "hybrid queue, as discussed above. With the "hybrid queue," a value between Beta_A and Beta_B may be selected.

As may be understood based on the preceding discussion, the example task scheduler 114 may achieve optimized equalization performance for a time-varying channel environment. In particular, and as discussed above in connection with FIGS. 1-5, the task scheduler 114 of the present disclosure may enable: (1) the dynamic scheduling of dual-path equalizer coefficient-calculation and order-search tasks according to channel parameters based on block task queues; (2) the dynamic determination of model order update rate according to channel parameters; and (3) adaptive set-up of order-search range changing rate and order-search range according to channel parameters. Additionally, it is contemplated that the example equalizer 102, including the example task scheduler 114 and a single instance of the ECG 106, may be incorporated into relatively "lower-end" mobile user equipment without prohibitively raising the price point of such user equipment from the consumer perspective. Other benefits and/or advantages may be possible or otherwise realized as well.

Figure 6:
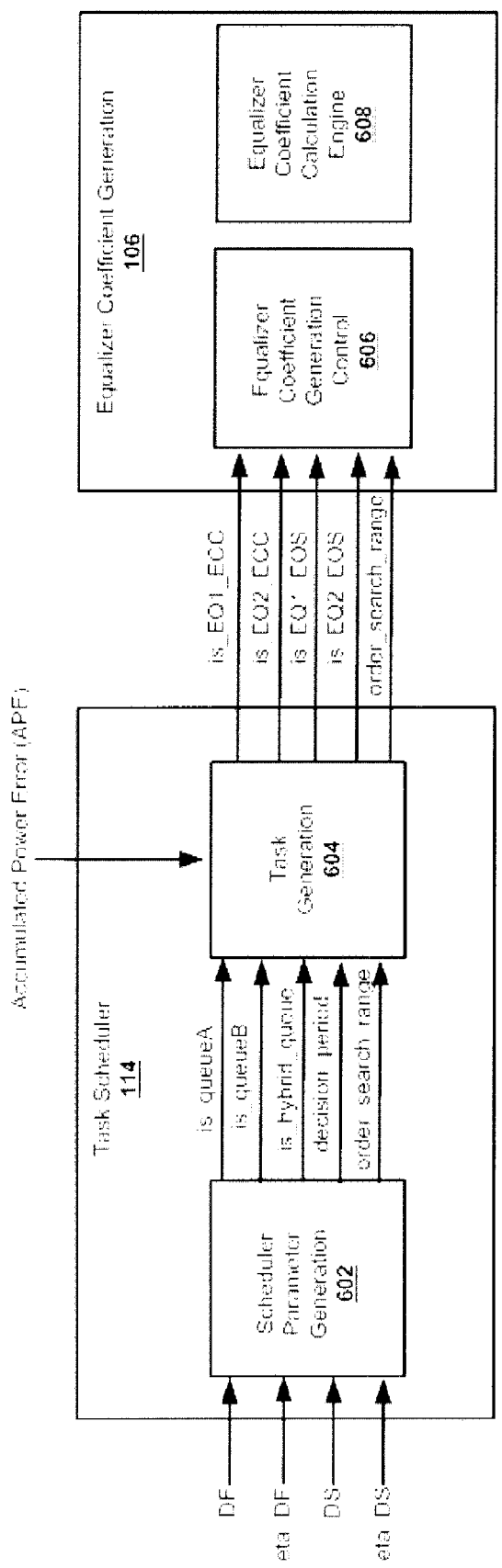
FIG. 6 shows a block diagram indicating example signal flow between a task scheduler and an equalizer coefficient generator of the example equalizer of FIG. 1.

FIG. 6 shows a block diagram indicating example signal flow between the task scheduler 114 and the ECG 106 of the example equalizer 102 of FIG. 1. In particular, and at least based on certain criteria described above in connection with FIGS. 3-5, FIG. 6 shows the task scheduler 114 including a parameter generator 602 and a task generator 604, and also shows the ECG 106 including a coefficient generation control 606 and a coefficient calculation engine 608. Other embodiments of the task scheduler 114 and the ECG 106 are possible as well. For example, one or both of the task scheduler 114 and the ECG 106 may generally include more or fewer other elements and/or the components as desired. Further, number and type of elements or components as incorporated within the task scheduler 114 and/or the ECG 106 may or may not be implementation specific.

In practice, and based on acquired or calculated values of estimated maximum Doppler frequency (DF), estimated delay spread (DS), threshold Doppler frequency (eta_DF), and threshold delay spread (eta_DS), the parameter generator 602 may calculate control parameters: is_queueA, is_queueB, is_hybrid_queue, decision_period, and order search range based on criteria set forth in FIGS. 3-5. These control parameters may be transferred to the task generator 604 and utilized therein to determine or otherwise generate "current" task type signals is_EQ1_ECC, is_EQ2_ECC, is_EQ1_EOS, is_EQ2_EOS, and the order search range for a "current" task. The control parameters may be transferred to the coefficient generation control 606 and utilized to control operation of the coefficient calculation engine 608. In this manner, the task scheduler 114 may be configured to optimize performance of the equalizer 102 for time-varying wireless communication channels by dynamically assigning signal equalization tasks, to be implemented by the ECG 106, as described throughout.

Figure 7:
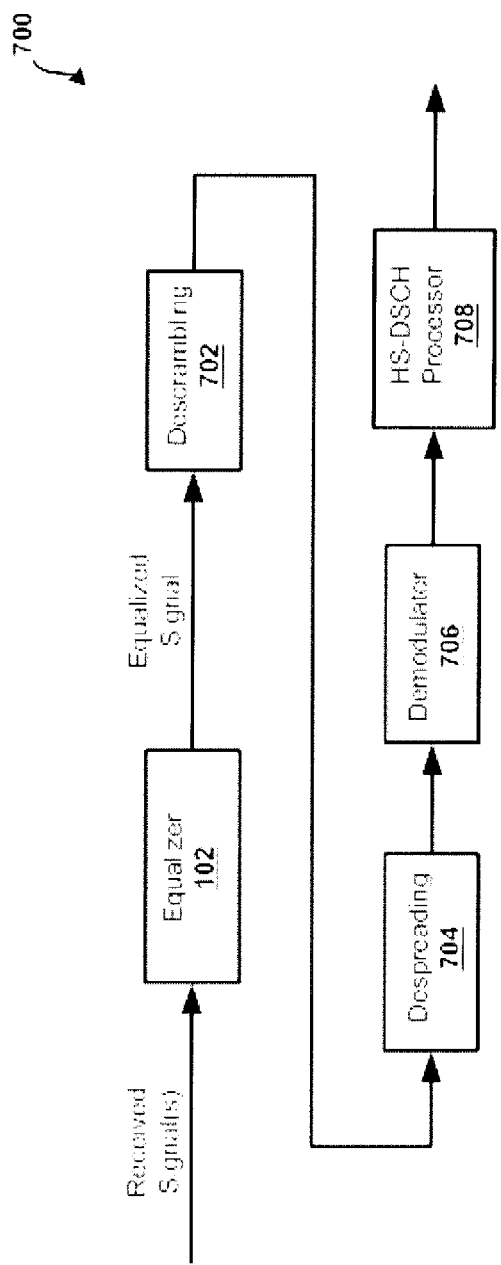
FIG. 7 shows example logical modules, including the example dual-receive-path equalizer of FIG. 1, of an example HSDPA receiver.

FIG. 7 shows example logical modules of a UMTS (Universal Mobile Telecommunications System) 3GPP WCDMA HSDPA receiver 700, including the dual-receive-path equalizer 102 of the present disclosure. For brevity, the example receiver 700 is depicted in a conceptual, simplified form. However, the receiver 700 may generally include more or fewer other elements and/or the components as desired.

In practice, the equalizer 102 may generate an equalized signal at least based on an input of a received signal(s), such as discussed above in connection with FIGS. 1-6. In this example, the equalized signal may subsequently be passed to a plurality of signal processing modules for further processing, as may be understood by an ordinary skilled artisan. For example, the equalized signal may subsequently be passed to a descrambling module 702 that is in series with a despreading module 704, a demodulator module 706, and a HS-DSCH (High Speed Downlink Shared Channel) processing module 708. In one embodiment, the HS-DSCH processing module 708 may at least implement HARQ (Hybrid Automatic Repeat Request) de-processing and forward error correction. The equalized signal may subsequently be passed to other logical modules for further processing as desired.

Figure 8:
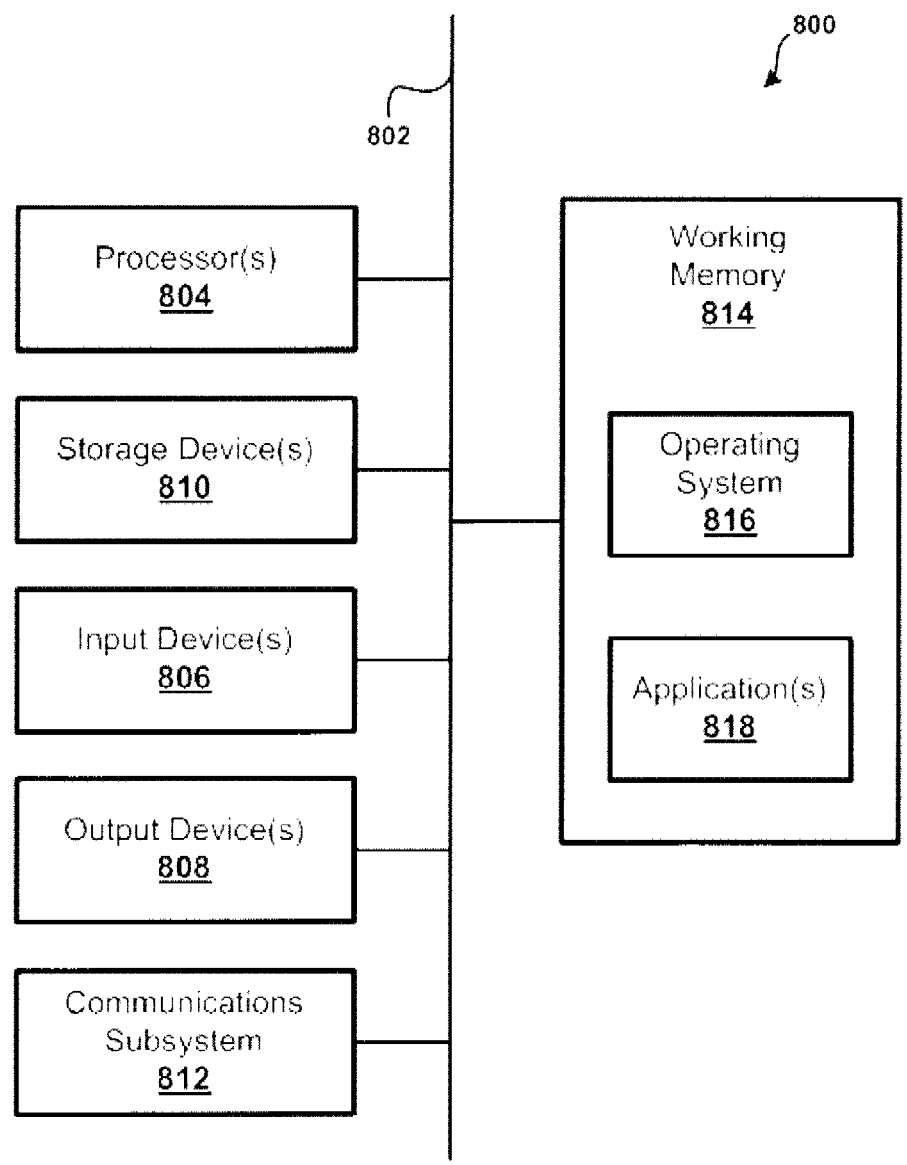
FIG. 8 shows an example computing system or device.

FIG. 8 illustrates an embodiment of an example computer system/device 800. An example of a computer device includes a mobile user equipment or terminal (e.g., smartphone), an enterprise server, blade server, desktop computer, laptop computer, personal data assistant, gaming console, and/or others. The example computer device 800 may be configured to perform and/or include instructions that, when executed, cause the computer system 800 to perform the example methods of FIGS. 3-5. It should be noted that FIG. 8 is intended only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which can include without limitation a remote control, a mouse, a keyboard, and/or the like; and one or more output devices 808, which can include without limitation a presentation device (e.g., television), a printer, and/or the like.

The computer system 800 may further include (and/or be in communication with) one or more non-transitory storage devices 810, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 800 might also include a communications subsystem 812, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 812 may permit data to be exchanged with a network (such as the network described below, to name one example), other computer systems, and/or any other devices described herein. In many embodiments, the computer system 800 will further comprise a working memory 814, which can include a RAM or ROM device, as described above.

The computer system 800 also can comprise software elements, shown as being currently located within the working memory 814, including an operating system 816, device drivers, executable libraries, and/or other code, such as one or more application programs 818, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 might cause the processor(s) 804 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 810. Volatile media include, without limitation, dynamic memory, such as the working memory 814.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 804 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 804 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as any combination of: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for dynamically scheduling multi-receive-path signal equalizer tasks, comprising:
   determining, by a computing device, an estimated maximum Doppler frequency and an estimated delay spread of a particular wireless communications channel at a particular time;
   identifying, by the computing device, a particular task queue format and a particular predictor model order update period based on the estimated maximum Doppler frequency and delay spread;
   selecting, by the computing device, a particular predictor model order update rate based on the identified particular equalizer task queue format; and
   generating, by the computing device, a plurality of task control signals based on the particular task queue format, the particular predictor model order-update period, and the particular predictor model order-search range, to control equalizer coefficient generation within a particular time period.

2. The method of claim 1, further comprising identifying a particular task queue format that specifies, within the particular time period, an equalizer coefficient generation task for a first receive path, an equalizer coefficient generation task for a second receive path, and an equalizer order-search task for one of the first receive path and the second receive path.

3. The method of claim 1, further comprising identifying a particular task queue format that specifies, within the particular time period, an equalizer coefficient generation task for a first receive path, and an equalizer order-search task for the first receive path.

4. The method of claim 1, further comprising identifying a particular task queue format that specifies a temporal switching between a first task queue format and a second different task queue format over multiple particular time periods.

5. The method of claim 1, further comprising identifying a particular task queue format that specifies a periodic temporal switching between a first task queue format and a second different task queue format over multiple particular time periods.

6. The method of claim 1, further comprising identifying a particular predictor model order update period based on a comparison of the estimated maximum Doppler frequency to a particular threshold value.

7. The method of claim 1, further comprising: calculating a plurality of equalizer coefficient values based on the plurality of task control signals and a channel estimation of the particular wireless communications channel at the particular time; and generating an equalized output signal based on the equalizer coefficient values and an input signal.

8. The method of claim 6, further comprising identifying a particular predictor model order update period based on a comparison of the estimated delay spread to a particular threshold value.

9. A computer-implemented method, comprising:
   acquiring, by a mobile user equipment (MUE), an estimated maximum Doppler frequency (DF) and an estimated delay spread (DS) of a particular wireless communications channel at a particular time;
   comparing, by the MUE, the estimated maximum DF against a threshold DF, and the estimated DS against a threshold DS; and
   selecting, by the MUE based on the comparing, a particular task queue to control signal equalizer tasks of the MUE within a particular time period, the particular task queue specifying, within the particular time period, at least one of an equalizer coefficient generation task for a first receive path and an equalizer coefficient generation task for a second receive path, and an equalizer order-search task for one of the first receive path and the second receive path.

10. The method of claim 9, further comprising the particular task queue specifying the equalizer coefficient generation task for the first receive path and the equalizer coefficient generation task for the second receive path, and the equalizer order-search task for one of the first receive path and the second receive path.

11. The method of claim 9, further comprising the particular task queue specifying a temporal switching between a first task queue and a second different task format over multiple particular time periods.

12. The method of claim 9, further comprising: selecting a particular predictor model order-update rate, and a particular predictor model order-update decision period; and generating a plurality of task control signals based on the particular task queue, the particular predictor model order-update period, and the particular predictor model order-search range, to control equalizer coefficient generation within the particular time period.

13. The method of claim 11, further comprising the first task queue specifying the equalizer coefficient generation task for the first receive path, the equalizer coefficient generation task for the second receive path, and the equalizer order-search task for the first receive path.

14. The method of claim 11, further comprising the second task queue specifying the equalizer coefficient generation task for the first receive path, the equalizer coefficient generation task for the second receive path, and the equalizer order-search task for the second receive path.

15. The method of claim 12, further comprising: calculating a plurality of equalizer coefficient values based on the plurality of task control signals and a channel estimation of the particular wireless communications channel at the particular time; and generating an equalized output signal based on the equalizer coefficient values and an input signal.

16. A multi-receive-path signal equalizer for a mobile user equipment, comprising:
an equalizer coefficient generator module configured to generate a first channel impulse response and a second channel impulse response;
a first filter module configured to generate a first equalized output signal by convolution of a first input signal, of a first signal-receive path, with the first impulse response;
a second filter module configured to generate a second equalized output signal by convolution of a second input signal, of a second signal-receive path, with the second impulse response; and
a task scheduler module configured to:
acquire an estimated maximum Doppler frequency (DF) and an estimated delay spread (DS) of a particular wireless communications channel at a particular time;
compare the estimated maximum DF against a threshold DF, and the estimated DS against a threshold DS; and
select, based on the comparing, a particular task queue to control signal equalizer tasks of the equalizer coefficient generator module within a particular time period, the particular task queue specifying, within the particular time period, at least one of an equalizer coefficient generation task for the first signal-receive path and an equalizer coefficient generation task for the second signal-receive path, and an equalizer order-search task for one of the first signal-receive path and the second signal-receive path; and
wherein the multi-receive-path signal equalizer is configured to sum together the first equalized output signal and the second equalized output signal to form an equalized signal.

17. The multi-receive-path signal equalizer of claim 16, further comprising a channel estimation module configured to: generate channel estimates as a function of channel state information of at least the particular wireless communications channel; and transfer the channel estimates to the equalizer coefficient generator module for generation of the first channel impulse response and the second channel impulse response.

18. The multi-receive-path signal equalizer of claim 16, wherein the particular task queue specifies a temporal switching between a first task queue and a second different task format over multiple particular time periods.

19. The multi-receive-path signal equalizer of claim 16, wherein the first task queue specifies the equalizer coefficient generation task for the first signal-receive path, the equalizer coefficient generation task for the second signal-receive path, and the equalizer order-search task for the first signal-receive path, and the second task queue specifies the equalizer coefficient generation task for the first signal-receive path, the equalizer coefficient generation task for the second signal-receive path, and the equalizer order-search task for the second signal-receive path.

20. The multi-receive-path signal equalizer of claim 16, wherein the multi-receive-path signal equalizer consists essentially of a single equalizer coefficient generator module.

* * * * *